US008793129B2

(12) United States Patent
Handa et al.

(10) Patent No.: US 8,793,129 B2
(45) Date of Patent: Jul. 29, 2014

(54) IMAGE DISPLAY DEVICE FOR IDENTIFYING KEYWORDS FROM A VOICE OF A VIEWER AND DISPLAYING IMAGE AND KEYWORD

(75) Inventors: Tetsuya Handa, Tokyo (JP); Kimiyasu Mizuno, Tokyo (JP); Takehiro Aibara, Tokyo (JP); Hitoshi Amagai, Tokyo (JP); Naotaka Uehara, Tokyo (JP); Takayuki Kogane, Tokyo (JP); Sumito Shinohara, Chiba (JP); Masato Nunokawa, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 352 days.

(21) Appl. No.: 12/888,725

(22) Filed: Sep. 23, 2010

(65) Prior Publication Data

US 2011/0071832 A1 Mar. 24, 2011

(30) Foreign Application Priority Data

Sep. 24, 2009 (JP) .................................. 2009-218784

(51) Int. Cl.
*G10L 15/26* (2006.01)
*G10L 15/18* (2013.01)
*G06F 17/21* (2006.01)

(52) U.S. Cl.
USPC ............ 704/235; 704/272; 704/276; 715/202

(58) Field of Classification Search
CPC ....... G10L 15/18; G10L 18/26; G10L 18/265; G06F 17/21; G06F 17/241; G06F 17/2795; G06F 17/30268

USPC .......... 704/235, 270, 272, 276; 707/723, 748; 382/229, 306; 715/201, 202
See application file for complete search history.

(56) References Cited

U.S. PATENT DOCUMENTS 6,044,365 A * 3/2000 Cannon et al. ................. 707/741
6,243,713 B1 * 6/2001 Nelson et al. ........................ 1/1
(Continued)

FOREIGN PATENT DOCUMENTS

| JP | 2006-195637 A | 7/2006 |
| JP | 2008-014818 A | 1/2008 |
| JP | 2008-306403 A | 12/2008 |
| JP | 2009-058834 A | 3/2009 |

OTHER PUBLICATIONS

Japanese Office Action dated Jul. 5, 2011 (and English translation thereof) in counterpart Japanese Application No. 2009-218784.

*Primary Examiner* — Martin Lerner
(74) *Attorney, Agent, or Firm* — Holtz Holtz Goodman & Chick PC (57) ABSTRACT

It is an object of the present invention to make an act of viewing an image interactive and further enriched. A microphone 18 inputs a voice signal of a voice uttered by a viewer who is viewing a display image displayed on a display portion 17, and causes the voice signal to be stored in a buffer 19. A voice recognition portion 20 identifies at least one word from the voice uttered by the viewer based on the voice signal, and acquires them as a keyword. A counter 21 calculates the number of incidences of the keyword. A display driver 16 causes information including a keyword having a number of incidences that exceeds a threshold value or information derived from the keyword to be displayed together with the display image displayed on the display portion 17.

7 Claims, 4 Drawing Sheets

(56) References Cited

U.S. PATENT DOCUMENTS

| | | | |
|---|---|---|---|
| 6,539,116 B2* | 3/2003 | Takaoka | 382/229 |
| 6,732,078 B1* | 5/2004 | Luomi et al. | 704/270.1 |
| 7,447,626 B2* | 11/2008 | Chaney et al. | 704/9 |
| 7,831,598 B2* | 11/2010 | Ko | 707/736 |
| 7,844,115 B2* | 11/2010 | Ohwa et al. | 382/190 |
| 7,996,227 B2* | 8/2011 | Boyle et al. | 704/270 |
| 8,316,302 B2* | 11/2012 | McKoen et al. | 715/728 |
| 8,385,588 B2* | 2/2013 | Jacoby et al. | 382/100 |
| 2003/0115552 A1* | 6/2003 | Jahnke et al. | 715/536 |
| 2004/0059996 A1* | 3/2004 | Fasciano | 715/500.1 |
| 2004/0260558 A1* | 12/2004 | Loui et al. | 704/272 |
| 2005/0228671 A1* | 10/2005 | Olorenshaw et al. | 704/260 |
| 2005/0228676 A1* | 10/2005 | Ifukube | 704/275 |
| 2005/0283741 A1* | 12/2005 | Balabanovic et al. | 715/838 |
| 2006/0015339 A1* | 1/2006 | Charlesworth et al. | 704/251 |
| 2006/0195445 A1* | 8/2006 | Julia et al. | 707/6 |
| 2007/0174326 A1* | 7/2007 | Schwartz et al. | 707/102 |
| 2007/0288451 A1* | 12/2007 | Meyer et al. | |
| 2008/0033983 A1* | 2/2008 | Ko | 707/102 |
| 2008/0256100 A1* | 10/2008 | van de Sluis et al. | |
| 2009/0002497 A1* | 1/2009 | Davis | 348/207.99 |
| 2009/0092340 A1* | 4/2009 | Arguelles | 382/306 |
| 2009/0150147 A1* | 6/2009 | Jacoby et al. | 704/235 |
| 2009/0271380 A1* | 10/2009 | Julia et al. | 707/3 |
| 2009/0327263 A1* | 12/2009 | Maghoul | 707/5 |
| 2010/0005378 A1* | 1/2010 | Braun et al. | 715/202 |
| 2010/0179972 A1* | 7/2010 | Asano et al. | 707/825 |
| 2010/0238323 A1* | 9/2010 | Englund | 348/239 |
| 2011/0040754 A1* | 2/2011 | Peto et al. | 707/736 |

* cited by examiner

IMAGE DISPLAY DEVICE FOR IDENTIFYING KEYWORDS FROM A VOICE OF A VIEWER AND DISPLAYING IMAGE AND KEYWORD

This application is based on and claims the benefit of priority from Japanese Patent Application No. 2009-218784 filed on Sep. 24, 2009, the content of which is incorporated herein by reference.

BACKGROUND OF THE INVENTION

1. Field of the Invention

The present invention relates to a technology of displaying an image, and particularly, to an image display device, a method and a program that make an act of viewing an image interactive and further enriched.

2. Related Art

Conventionally, as a display device of images (including photographs), a personal computer, a digital photo frame and the like have been developed, and as their display methods, a slide show display is widely known (See Japanese Unexamined Patent Application Publication No. 2008-306403, for example).

SUMMARY OF THE INVENTION

However, this slide show display is a method of sequentially displaying a plurality of selected images and, after the settings have been made, a viewer merely views the images displayed sequentially. Therefore, the viewer can only view the images displayed by the digital photo frame in a unilateral way. As a result, enriched viewing, for example, in such a manner that the intention of the viewer is reflected at any time cannot be realized.

The present invention is made in view of the above problem, and it is an object of the present invention to provide an image display device, a method and a program for making an act of viewing an image interactive and further enriched.

In accordance with a first aspect of the present invention, there is provided an image display device comprising: a voice input portion that inputs a voice signal of a voice uttered by a viewer who is viewing a display image displayed on a display portion; an acquisition portion that identifies at least one word from the voice uttered by the viewer based on the voice signal inputted to the voice input portion and acquires as a keyword the at least one word thus identified; and a control portion that causes information including the keyword acquired by the acquisition portion or information derived from the keyword to be displayed together with the display image on the display portion.

In accordance with a second aspect of the present invention, the image display device may, further comprise a count portion that calculates a number of incidences of the keyword acquired by the acquisition portion, wherein the control portion causes information including the keyword having a number of incidences calculated by the count portion that exceeds a threshold value or information derived from the keyword to be displayed together with the display image displayed on the display portion.

In accordance with a third aspect of the present invention, the control portion may cause the information including a keyword having a number of incidences that exceeds the threshold value or the information derived from the keyword to be displayed together with the display image on the display portion in a display form accompanied with an entertaining effect.

In accordance with a fourth aspect of the present invention, the image display device may further comprise a generation portion that generates a new keyword based on the keyword acquired by the acquisition portion and the information relating to the display image, wherein the control portion causes the new keyword generated by the generation portion as information derived from the keyword to be displayed on the display portion together with the display image.

In accordance with a fifth aspect of the present invention, the image display device may further comprise a detection portion that detects a face of a person from the display image, wherein the control portion causes a balloon in which information including the keyword or a character string of information derived from the keyword are arranged from the mouth of the face thus detected to be displayed in the display image if the detection portion succeeds in detection of the face, and causes the information including the keyword or the information derived from the keyword to be displayed in a predetermined region in the display image if the detection portion fails in the detection of the face.

In accordance with a sixth aspect of the present invention, there is provided an image display method comprising: a voice input control step of inputting a voice signal of a voice uttered by a viewer who is viewing a display image displayed on a display portion; an acquisition step of identifying at least one word from the voice uttered by the viewer based on the voice signal inputted by way of voice control processing in the voice input control step and acquiring the at least one word thus identified as a keyword; and a display control step of causing information including the keyword acquired in the acquisition step or information derived from the keyword to be displayed together with the display image on the display portion.

In accordance with a seventh aspect of the present invention, there is provided a program causing a computer that controls an image display device to implement: a voice input control function that inputs a voice signal of a voice uttered by a viewer who is viewing a display image displayed on a display portion; an acquisition function that identifies at least one word from the voice uttered by the viewer based on the voice signal inputted by way of control processing of the voice input control function and acquires the at least one word thus identified as a keyword; and a display control function that causes information including the keyword acquired by the acquisition function or information derived from the keyword to be displayed together with the display image on the display portion.

According to the present invention, it is possible to make an act of viewing an image interactive and further enriched.

DETAILED DESCRIPTION OF THE INVENTION

An embodiment of the present invention will be described below with reference to accompanying drawings.

Figure 1:
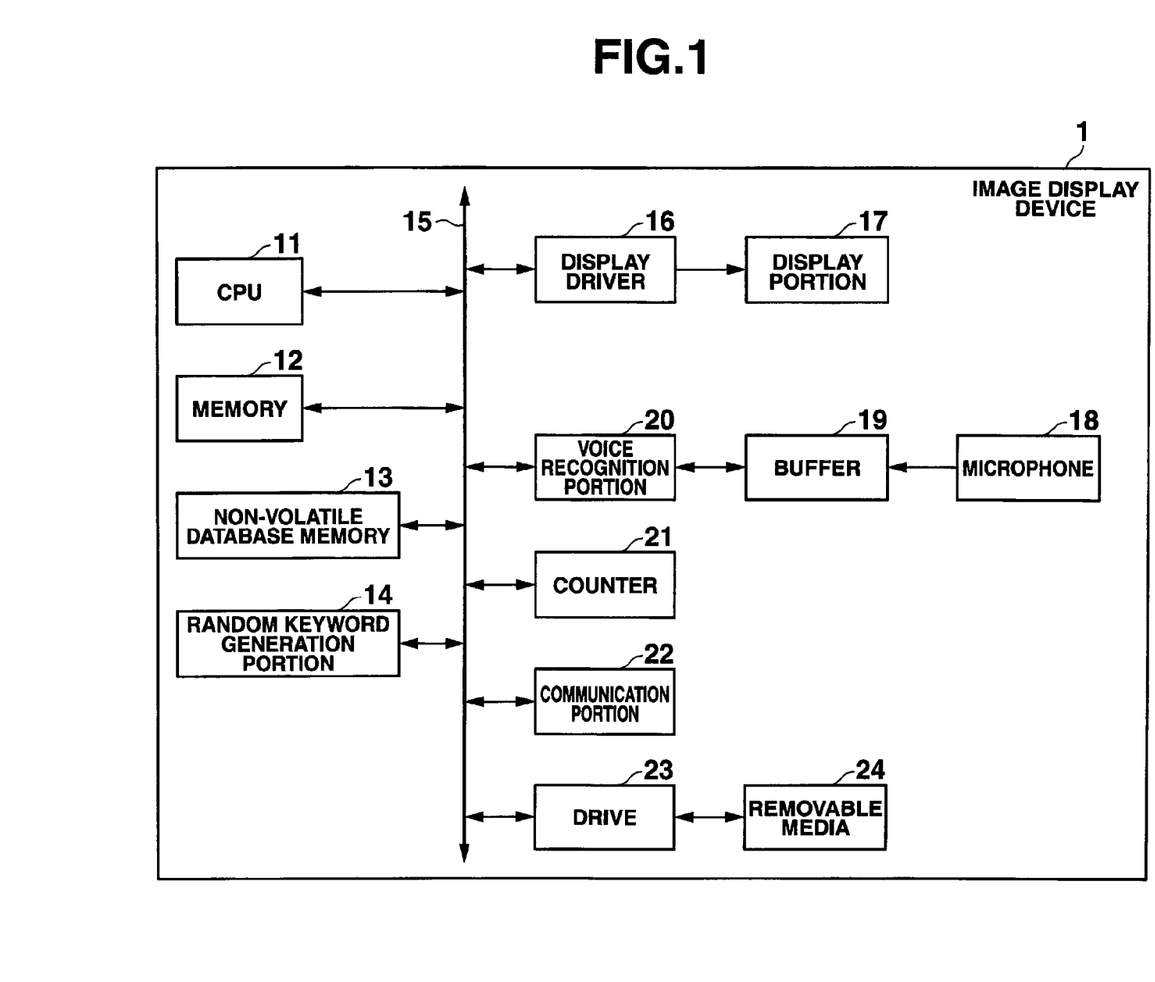
FIG. 1 is a block diagram illustrating a configuration of hardware of an embodiment of an image display device according to the present invention.

FIG. 1 is a diagram illustrating a configuration of hardware of an embodiment of an image display device 1 according to the present invention. The image display device 1 can be constituted by a digital photo frame, a personal computer and the like, for example.

The image display device 1 includes a CPU (Central Processing Unit) 11, a memory 12, a non-volatile database memory 13, a random keyword generation portion 14, a bus 15, a display driver 16, a display portion 17, a microphone 18, a buffer 19, a voice recognition portion 20, a counter 21, a communication portion 22, and a drive 23.

The CPU 11 executes various types of processing according to a program stored in a ROM (Read Only Memory) included in the memory 12. Alternatively, the CPU 11 executes various types of processing according to a program loaded from the non-volatile database memory 13 to a RAM (Random Access Memory) included in the memory 12.

The RAM also stores data and the like required for execution of the various types of processing executed by the CPU 11 as appropriate.

In the present embodiment, the CPU 11 controls the display driver 16 to have images (including photographs) displayed on the display portion 17. Hereinafter, the image displayed on the display portion 17 will be referred to as "display image". In the present embodiment, the CPU 11 drives and controls the microphone 18 so as to input a time-series signal of a voice (speech) continuously uttered by a viewer who is viewing the display image. Herein, the time-series signal of the voice refers to a digital signal of the voice uttered within a predetermined period. However, an input signal is not particularly limited to the time-series signal of the present embodiment, and may be any signal as long as the signal can be used as a processing target of voice recognition. This means that the input signal may be an analog voice signal in a certain period, for example. The CPU 11 controls the voice recognition portion 20 to have the voice recognition portion 20 execute predetermined voice recognition processing on the time-series signal of the voice thus inputted, so as to identify one or more words from the time-series signal of the voice and acquire as a keyword the one or more words thus identified. Here, as a keyword, one word may be acquired. Alternatively, a word string consisting of a plurality of words may be acquired as a keyword. In addition, only one keyword may be acquired or a plurality of keywords may be acquired. The CPU 11 causes information including the keyword or the information derived from the keyword to be displayed on the display portion 17 together with the display image.

Hereinafter, the above series of processing will be referred to as "image display processing". That is, in the present embodiment, a program for realizing the image display processing is stored in the memory 12 or in the non-volatile database memory 13. The image display processing will be described later in more detail with reference to FIG. 2.

After the CPU 11 starts the image display processing as above, if the viewer utters speech while viewing the display image, one or more words included in the speech contents are acquired as a keyword. Then, the information including the keyword or the information derived from the keyword is added to the display image and displayed. As a result, an act of viewing is no longer a unilateral act for a viewer and becomes an interactive and further enriched act.

The non-volatile database memory 13 stores various data in addition to the above-mentioned program. For example, image data is stored in the non-volatile database memory 13, in association with meta data. Moreover, data of a keyword included in the speech contents of a viewer who is viewing the display image and data of the number of incidences of the keyword are also stored in the non-volatile database memory 13, in association with image data indicative of the display image. Specific examples of the stored contents of the non-volatile database memory 13 will be described later with reference to FIG. 3.

The random keyword generation portion 14 generates a new keyword based on the keyword included in the speech contents of a viewer who is viewing the display image and the meta data of the display image. In the present embodiment, the new keyword can be displayed on the display portion 17 as an example of the information derived from the keyword included in the speech contents of the viewer.

The CPU 11, the memory 12, the non-volatile database memory 13, and the random keyword generation portion 14 are connected to one another via the bus 15. With this bus 15, the display driver 16, the voice recognition portion 20, the counter 21, the communication portion 22, and the drive 23 are also connected.

The display driver 16 acquires predetermined image data from the non-volatile database memory 13 and causes the display image to be displayed on the display portion 17 based on the image data. The display portion 17 is constituted by a liquid crystal display, for example.

The microphone 18 receives input of a voice (speech) uttered by the viewer and outputs it as a voice signal. The buffer 19 stores the voice signal thus outputted for a predetermined period from the microphone 18. That is, the buffer 19 stores the time-series signal of the voice. The voice recognition portion 20 executes the voice recognition processing on the time-series signal of the voice stored in the buffer 19, so as to identify one or more words included in the speech contents of the viewer, and acquire one or more keywords based on the identification result. The voice recognition algorithm of the voice recognition portion 20 is not particularly limited.

The counter 21 monitors the processing of the voice recognition portion 20 and calculates the number of incidences of the keyword. The counter 21 also generates an interruption signal at a timing when the number of keyword incidences exceeds a threshold value, and supplies it to the CPU 11. Then, the CPU 11 controls the display driver 16 and causes the keyword having a number of incidences exceeding the threshold value or the information derived from the keyword to be displayed on the display portion 17 together with the display image.

The communication portion 22 controls communication performed among other devices (not illustrated) via a network including the Internet. A removable media 24 including a magnetic disk, an optical disk, a magnetic optical disk or a semiconductor memory and the like is attached to the drive 23, as appropriate. Then, the program read out therefrom is installed in the non-volatile database memory 13 as necessary. In place of the non-volatile database memory 13, the removable media 24 may also store various data such as image data to be displayed.

Figure 2:
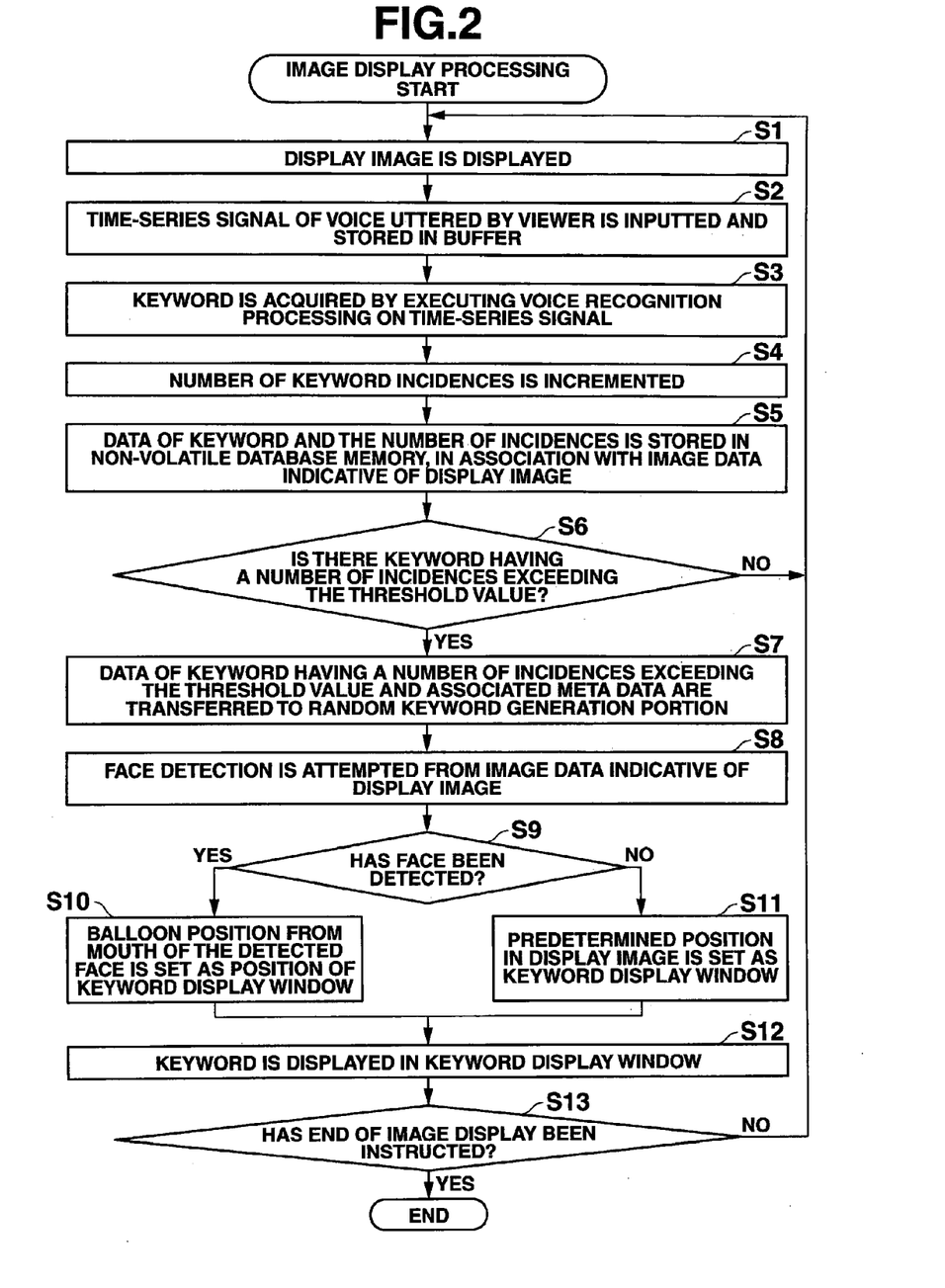
FIG. 2 is a flowchart illustrating an example of a flow of the image display processing by the image display device shown in FIG. 1.

FIG. 2 is a flowchart illustrating an example of a flow of the image display processing carried out by the image display device 1 shown in FIG. 1.

In Step S1, the CPU 11 reads predetermined image data from the non-volatile database memory 13, and controls the display driver 16 to cause the display image to be displayed on the display portion 17 based on the image data.

In Step S2, the CPU 11 drives and controls the microphone 18, to receive input of the time-series signal of the voice uttered by the viewer, and causes it to be stored in the buffer 19.

In Step S3, the CPU 11 controls the voice recognition portion 20, so as to read out the time-series signal of the voice from the buffer 19, and execute the voice recognition processing on the time-series signal of the voice, thereby acquiring the keyword.

In Step S4, the CPU 11 controls the counter 21 so as to increment the number of keyword incidences.

In Step S5, the CPU 11 stores data of the keyword and the number of incidences in the non-volatile database memory 13, in association with the image data indicative of the display image.

In a case in which a plurality of keywords is acquired in the processing of Step S3, the respective processing of Steps S4 and S5 is executed individually for each of the plurality of keywords.

In Step S6, the CPU 11 determines whether or not there is a keyword having a number of incidences that exceeds a threshold value.

If the respective numbers of incidences of all the keywords fall below the threshold value, the above-mentioned interruption signal is not generated from the counter 21, it is determined to be NO in Step S6, the processing is returned to Step S1, and the subsequent processing is repeated. That is, loop processing from Step S1 to Step S6 is repeated, one or more keywords are acquired from the speech contents (time-series signal of the voice) of the viewer in each processing loop and the number of incidences is incremented.

When the number of incidences of a predetermined keyword exceeds the threshold value, the interruption signal is generated from the counter 21 and supplied to the CPU 11. As a result, it is determined to be YES in Step S6, and the processing proceeds to Step S7.

In Step S7, the CPU 11 transfers the data of the keyword having a number of incidences that exceeds the threshold value and the associated meta data to the random keyword generation portion 14. As a result, the random keyword generation portion 14 generates a new keyword based on the data of the keyword and the meta data thus transferred.

In Step S8, the CPU 11 attempts face detection from the image data indicative of the display image. In Step S9, the CPU 11 determines whether a face has been detected or not.

In a case in which one or more faces are detected in the processing of Step S8, it is determined to be YES in Step S9, and the processing proceeds to Step S10. In Step S10, the CPU 11 sets a balloon position from the mouth of the detected face (if a plurality of faces are detected, one specific face) as a position of a keyword display window.

On the other hand, in the processing of Step S8, in a case in which no face has been detected in the processing of Step S8, it is determined to be NO in Step S9, and the processing proceeds to Step S11. In Step S11, the CPU 11 sets a predetermined position in the display image as the position of the keyword display window.

When the position of the keyword display window has been set in the processing of Step S10 or Step S11, the processing proceeds to Step S12. In Step S12, the CPU 11 controls the display driver 16 to cause the keyword to be displayed in the keyword display window (See FIG. 4, which will be described later). This means that, among the display images displayed on the display portion 17, the keyword is displayed in a region set as the position of the keyword display window. In other words, the display image to which the keyword has been added is displayed on the display portion 17.

In the processing of Step S12, the CPU 11 may display the keyword (keyword included in the speech contents of the user) having a number of incidences that exceeds the threshold value, may display a new keyword generated by the random keyword generation portion 14, or may display both keywords at the same time. In addition, the CPU 11 may not only display such keyword(s), and may newly generate a sentence including these keywords, and display the sentence. The display forms regarding how the keyword is displayed are not particularly limited either. Some examples of preferred display forms will be described later.

In Step S13, the CPU 11 determines whether the end of the image display has been instructed or not.

In a case in which the end of the image display has not been instructed yet, it is determined to be NO in Step S13, the processing is returned to Step S1, and the subsequent processing is repeated. That is, up until the end of the image display is instructed, the above-mentioned processing loop from Step S1 to Step S13 is repeated.

Thereafter, in a case in which the end of the image display is instructed, it is determined to be YES in Step S13, and the image display processing is terminated.

The image display processing will be described in detail below with reference to FIGS. 3 and 4.

Figure 3:
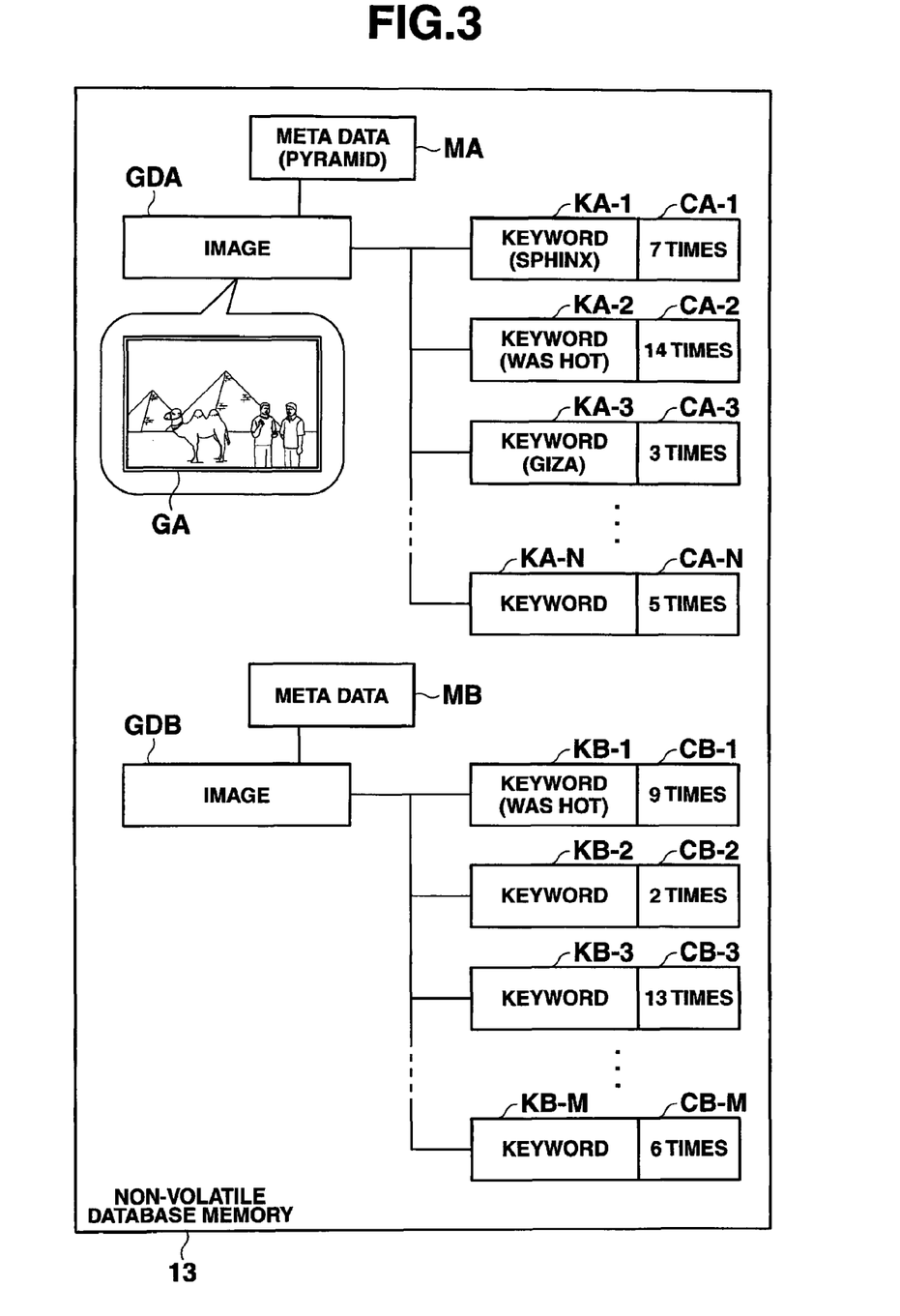
FIG. 3 is a diagram illustrating an example of stored contents of a non-volatile database memory 13 serving as a database of the image display device shown in FIG. 1.

FIG. 3 is a diagram illustrating an example of stored contents of the non-volatile database memory 13.

In the example in FIG. 3, two sets of image data, i.e. GDA and GDB, are stored in the non-volatile database memory 13.

An image GA depicted by the image data GDA is, for example, a commemorative photo with a pyramid in the background, as shown in FIG. 3. Meta data MA including information of "pyramid" is stored in the non-volatile database memory 13 in association with the image data GDA. In addition, a set of data KA-1 indicative of a keyword and data CA-1 indicative of the number of incidences to a set of data KA-N indicative of a keyword and data CA-N indicative of the number of incidences are stored in the non-volatile database memory 13 in association with the image data GDA. The reference symbol N is an integer value of no less than 1. The reference symbol N is an integer value of no less than 4 in the example in FIG. 3. That is, FIG. 3 shows a state in which the image display processing of FIG. 2 has been started and the processing loop from Step S1 to Step S6 has already been repeated several times under the condition that the threshold value of, for example, no less than 14 is set while the image GA is displayed on the display portion 17.

On the other hand, meta data MB is stored in the non-volatile database memory 13, in association with the image data GDB of an image (not illustrated) different from the image GA. In addition, the set of the data KB-1 indicative of the keyword and the data CB-1 indicative of the number of incidences through to the set of the data KB-M indicative of the keyword and the data CB-M indicative of the number of incidences are stored in the non-volatile database memory 13 in association with the image data GDB. The reference symbol M is an integer value of no less than 1. The reference symbol M is an integer value of no less than 4 in the example of FIG. 3. That is, FIG. 3 shows a state in which the image display processing of FIG. 2 has been started and the processing loop from Step S1 to Step S6 has already been repeated several times under the condition that the threshold value of, for example, no less than 13 is set while an image different from the image GA is displayed on the display portion 17.

For example, it is assumed that the processing of Step S1 is executed under the condition that the stored contents of the non-volatile database memory 13 is in a state as shown in FIG. 3, and the image GA is displayed on the display portion 17. Then, it is assumed that a plurality of viewers converse about recollections of their trip or the like while viewing the image GA.

In this case, when one of the plurality of viewers speaks, the time-series signal of the voice is inputted in the processing of Step S2, and stored in the buffer 19. Then, in the processing of the subsequent Step S3, the voice recognition processing is executed on the time-series signal, and one or more keywords are acquired. Here, it is assumed that the keywords of "sphinx", "was hot", and "Giza" have been acquired, for example. Furthermore, it is assumed that, as shown in FIG. 3, the data KA-1 is data indicative of "sphinx", the data KA-2 is data indicative of "was hot", and the data KA-3 is data indicative of "Giza".

In this case, in the processing of Step S4, the number of incidences of "sphinx" indicated by the data KA-1 is incremented from "7 times" to "8 times". The number of incidences of "was hot" indicated by the data KA-2 is incremented from "14 times" to "15 times". The number of incidences of "Giza" indicated by the data KA-3 is incremented from "3 times" to "4 times".

Although not illustrated, in the processing of the subsequent Step S5, the data KA-1 indicative of "sphinx" and the data CA-1 indicative of the number of incidences equal to "8 times" are stored (overwritten) in the non-volatile database memory 13, in association with the image data GDA. The data KA-2 indicative of "was hot" and the data CA-2 indicative of the number of incidences equal to "15 times" are stored (overwritten) in the non-volatile database memory 13, in association with the image data GDA. The data KA-3 indicative of "Giza" and the data CA-3 indicative of the number of incidences equal to "4 times" are stored (overwritten) in the non-volatile database memory 13, in association with the image data GDA.

The other data stored in the non-volatile database memory 13 is not updated (overwritten). For example, both of the keyword indicated by the data KA-2 associated with the image data GDA, and the keyword indicated by the data KB-1 associated with the image data GDB, are "was hot", and thus are the same. Even in this case, since the image indicated by the image data GDB is not the display image, the set of the data KB-1 indicative of "was hot" and the data CB-1 indicative of "9 times" stored in the non-volatile database memory 13 is not updated (overwritten).

Here, in a case in which the threshold value is 15 times, for example, a keyword having a number of incidences that exceeds the threshold value does not exist in the above-mentioned example. Therefore, in this case, since an interruption signal is not generated from the counter 21, it is determined to be NO in the processing of Step S6, the processing is returned to Step S1, and the subsequent processing is repeated.

On the other hand, in a case in which the threshold value is 14 times, for example, since the number of incidences of "was hot" indicated by the data KA-2 has been updated to "15 times" in the above-mentioned example, the threshold value has been exceeded. Therefore, in this case, since the interruption signal is generated from the counter 21 and supplied to the CPU 11, it is determined to be YES in Step S6, and the processing proceeds to Step S7.

In the processing of Step S7, the data KA-2 indicative of "was hot" having a number of incidences that exceeds the threshold value and the meta data MA are transferred to the random keyword generation portion 14. The random keyword generation portion 14 recognizes that "pyramid" included in the meta data MA belongs to the category of "world heritage", for example. Then, the random keyword generation portion 14 combines "was hot" and "world heritage" and generates a new keyword of "Taj Mahal", for example.

In the processing of Step S8, detection of the face included in the image GA is attempted based on the image data GDA.

Figure 4:
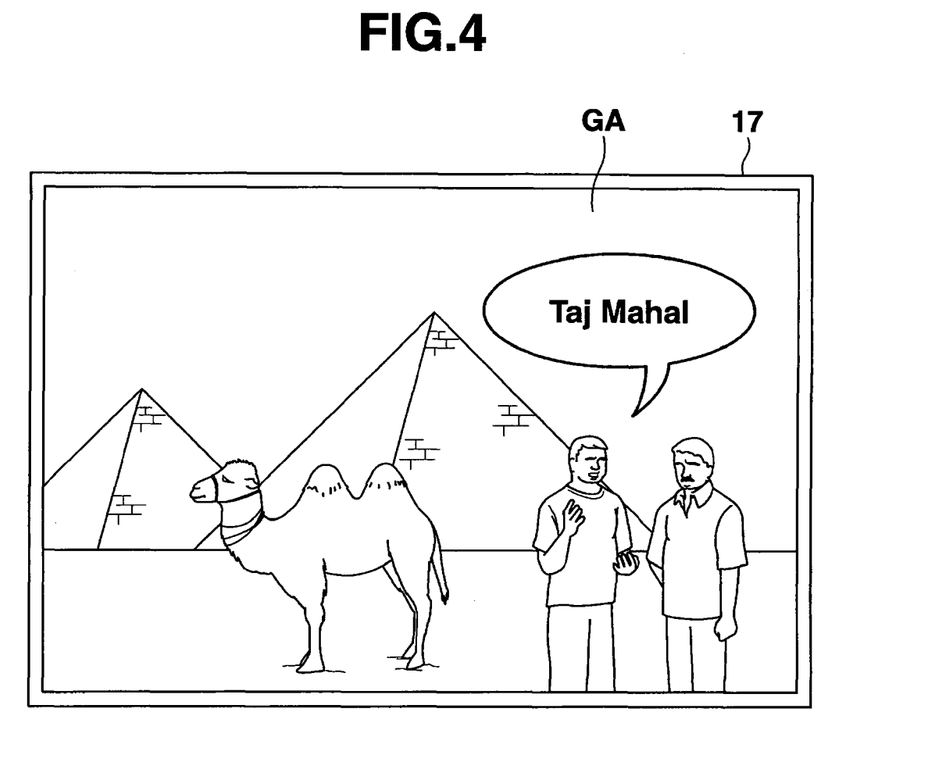
FIG. 4 is a diagram illustrating an example of an image displayed by the image display device shown in FIG. 1.

As shown in FIG. 4, since the faces of two persons are included in the image GA, it is determined to be YES in the processing of Step S9, and a position of a balloon from the mouth of one of the faces of the two persons, i.e. the face on the left side in FIG. 4, for example, is set as a position of a keyword display window in the processing of Step S10. As a result, in the processing of Step S12, as shown in FIG. 4, the keyword of "Taj Mahal", for example, is displayed at the balloon position. As mentioned above, it is possible to display "was hot" having a number of incidences exceeding the threshold value instead of or together with the keyword "Taj Mahal".

As explained above, the present embodiment of the image display device 1 receives an input of a time-series signal of a voice uttered by a viewer viewing the display image displayed on the display portion 17. The image display device 1 acquires a word or a word string included in the contents of the voice uttered by the viewer as a keyword based on the time-series signal. The image display device 1 causes the information including the keyword or the information derived from the keyword to be displayed together with the display image on the display portion 17.

As a result, for the viewer, the act of viewing is no longer a unilateral act, and becomes an interactive and further enriched act. In the above-mentioned example, if the viewer sees the keyword "Taj Mahal" displayed at the balloon position in FIG. 4, the viewer may be reminded of the thought of "Let's go to the Taj Mahal on our next trip". In this way, the viewing that cannot be acquired by merely watching the images can be realized for the viewers.

The present invention is not limited to the above-mentioned embodiment, and variations, improvements, and the like within the scope that can achieve the object of the present invention are included in the present invention.

For example, although the display form of the keyword is not particularly limited, by changing the display form for how the keyword is displayed, the viewing act of the image can be made interactive and further enriched.

For example, the keyword can be displayed with an entertaining effect that is changed in accordance with the number of incidences. More specifically, for example, if the processing loop from Step S1 to Step S13 in FIG. 2 is repeated, the number of keyword incidences will tend to increase. The number of keywords having a number of incidences that exceeds the threshold value will also tend to increase. Then, if supposing that the threshold value is 14 times as in the above-mentioned example, the CPU 11 causes the keyword having a number of incidences being 15 to 19 times to be displayed in an unaltered state, as the keyword having a number of incidences exceeding the threshold value. In the above-mentioned example, "was hot" is displayed in an unaltered state. The CPU 11 causes the keyword having a number of incidences that is 20 to 29 times to be displayed with a more attractive entertaining effect than the case with the number of incidences of 15 to 19 times, as the keyword having a number of incidences that exceeds the threshold value. As an attractive entertaining effect, an effect to increase the character size, an effect to decorate the character and the like can be employed, for example. In the above-mentioned example, the character string "was hot" is displayed larger or displayed with decorations. Moreover, for the keyword having a number of incidences that is 30 times or more, the CPU 11 displays a new keyword generated by the random keyword generation portion 14. In the above-mentioned example, "Taj Mahal" is displayed.

The entertaining effects are not particularly limited, and specific examples together with the above-mentioned examples are as follows, for example:

(1) An entertaining effect whereby the character size is set to be larger with an increase in the number of incidences;

(2) An entertaining effect whereby lateral slide-in or expand display is performed;

(3) An entertaining effect whereby an image of a balloon from the mouth of a person (the face detected by face detection) contained in the display image is displayed, and the keyword is displayed in the balloon, i.e. an entertaining effect as if the person is actually talking; and (4) An entertaining effect whereby the keyword included in the speech contents of the viewer is associated with the keyword included in the meta data indicative of the display image so as to create a new keyword, and the new keyword is displayed.

In addition, in the above-mentioned embodiment, for example, as a method of selecting a keyword to be displayed, a method of selecting the keyword based on whether or not the number of incidences has exceeded the threshold value is employed. However, the method of selecting a keyword to be displayed is not particularly limited to the above-mentioned embodiment, and an arbitrary method can be employed.

As mentioned above, the series of processing according to the present invention can be executed by hardware and also can be executed by software.

In a case in which the series of processing is to be executed by software, the program configuring the software is installed from a network or a storage medium in a computer or the like. The computer may be a computer incorporated in exclusive hardware. Alternatively, the computer may be a computer capable of executing various functions by installing various programs, i.e. a general-purpose personal computer, for example.

Although not illustrated, the storage medium containing the program can be constituted not only by removable media distributed separately from the device main body for supplying the program to a user, but also by a storage medium or the like supplied to the user in a state incorporated in the device main body in advance. The removable media includes a magnetic disk (including a floppy disk), an optical disk, a magnetic optical disk, or the like, for example. The optical disk includes a CD-ROM (Compact Disk-Read Only Memory), a DVD (Digital Versatile Disk), and the like. The magnetic optical disk includes an MD (Mini-Disk), or the like. The storage medium supplied to the user in the state incorporated in the device main body in advance includes the ROM included in the memory 12 in FIG. 1 storing the program, the non-volatile database memory 13 in FIG. 1, a hard disk, not illustrated, and the like, for example.

In the present description, the step describing the program stored in the storage medium includes not only the processing executed in a time series along the order, but also the processing executed in parallel or individually, which is not necessarily executed in a time series.

What is claimed is:

1. An image display device comprising:
    a voice input portion that inputs a voice signal of a voice uttered by a viewer who is viewing a display image displayed on a display portion;
    an acquisition portion that identifies at least one word from the voice uttered by the viewer based on the input voice signal, and acquires the at least one identified word as a first keyword;
    a generation portion that, based on both of the first keyword acquired by the acquisition portion and a second keyword included in meta data stored in advance in association with the display image displayed on the display portion, generates a new third keyword that is different from the first keyword and the second keyword; and
    a control portion that causes the third keyword generated by the generation portion to be displayed on the display portion together with the display image.

2. An image display device as set forth in claim 1, further comprising a count portion that calculates a number of incidences of the first keyword acquired by the acquisition portion.

3. An image display device as set forth in claim 2, wherein the generation portion generates the new third keyword based on both of (i) a high-incidence first keyword, the high-incidence first keyword being a first keyword of which a number of incidences calculated by the count portion exceeds a threshold, and (ii) the second keyword included in the meta data, the new third keyword being different from the high-incidence first keyword and the second keyword.

4. An image display device as set forth in claim 1, further comprising a detection portion that is configured to detect a face of a person in the display image,
    wherein (i) if the detection portion detects a face in the display image, the control portion causes a balloon in which a character string of the third keyword is arranged from a mouth of the detected face to be displayed in the display image, and (ii) if the detection portion does not detect a face in the display image, the control portion causes the third keyword to be displayed in a predetermined region in the display image.

5. An image display device as set forth in claim 3, further comprising a detection portion that is configured to detect a face of a person in the display image,
    wherein (i) if the detection portion detects a face in the display image, the control portion causes a balloon in which a character string of the third keyword is arranged from a mouth of the detected face to be displayed in the display image, and (ii) if the detection portion does not detect a face in the display image, the control portion causes the third keyword to be displayed in a predetermined region in the display image.

6. An image display method comprising:
    a voice input control step of inputting a voice signal of a voice uttered by a viewer who is viewing a display image displayed on a display portion;
    an acquisition step of identifying at least one word from the voice uttered by the viewer based on the input voice signal, and acquiring the at least one identified word as a first keyword;
    a generation step of generating, based on both of the first keyword acquired in the acquisition step and a second keyword included in meta data stored in advance in association with the display image displayed on the display portion, a new third keyword that is different from the first keyword and the second keyword; and
    a control step of causing the generated third keyword to be displayed on the display portion together with the display image.

7. A non-transitory computer-readable storage medium having a program stored thereon that is executable by a computer that controls an image display device, the program being executable by the computer to implement functions comprising:
    a voice input control function that inputs a voice signal of a voice uttered by a viewer who is viewing a display image displayed on a display portion;

an acquisition function that identifies at least one word from the voice uttered by the viewer based on the input voice signal, and acquires the at least one identified word as a first keyword;

a generation function that, based on both of the first keyword by the acquisition function and a second keyword included in meta data stored in advance in association with the display image displayed on the display portion, generates a new third keyword that is different from the first keyword and the second keyword; and a control function that causes the generated third keyword to be displayed on the display portion together with the display image.

\* \* \* \* \*